(12) United States Patent  
Wishart

(10) Patent No.: US 8,253,294 B1  
(45) Date of Patent: Aug. 28, 2012

(54) INCREASED EFFICIENCY DUAL ROTATIONAL ELECTRIC MOTOR/GENERATOR

(75) Inventor: Randell J. Wishart, Reno, NV (US)

(73) Assignee: E-Wish Technology, LLC, Reno, NV (US)

( * ) Notice: Subject to any disclaimer, the term of this patent is extended or adjusted under 35 U.S.C. 154(b) by 346 days.

(21) Appl. No.: 12/387,413

(22) Filed: May 1, 2009

Related U.S. Application Data

(60) Provisional application No. 61/126,320, filed on May 2, 2008, provisional application No. 61/137,681, filed on Aug. 1, 2008.

(51) Int. Cl.
*H02K 23/60* (2006.01)
*H02K 7/10* (2006.01)

(52) U.S. Cl. .................. 310/115; 310/95; 310/239

(58) Field of Classification Search .......... 310/115, 310/94–95, 121, 126, 239
See application file for complete search history.

(56) References Cited

U.S. PATENT DOCUMENTS

| | | | | |
|---|---|---|---|---|
| 2,223,210 A * | 11/1940 | Hefel | ................. | 310/95 |
| 2,391,103 A * | 12/1945 | Piron | ................. | 310/115 |
| 2,462,182 A * | 2/1949 | Guerdan et al. | .............. | 310/115 |
| 3,894,605 A * | 7/1975 | Salvadorini | .............. | 180/65.245 |
| 4,056,746 A * | 11/1977 | Burtis | ................. | 310/115 |
| 4,130,172 A * | 12/1978 | Moody | ................. | 180/65.6 |
| 5,844,345 A * | 12/1998 | Hsu | ................. | 310/178 |
| 6,749,532 B2 * | 6/2004 | Wachauer | ................. | 475/5 |
| 6,873,084 B2 * | 3/2005 | Richard | ................. | 310/239 |
| 7,466,053 B1 * | 12/2008 | Radev | ................. | 310/114 |

* cited by examiner

*Primary Examiner* — Burton Mullins
(74) *Attorney, Agent, or Firm* — James M. Ritchey

(57) ABSTRACT

An enhanced dual rotational electric motor/generator includes an armature that rotates about a central axis in one direction, a stator that rotates about the central axis in an opposite direction, an axle that extends along the central axis and is secured to the armature, an axle support, a rotational output alignment mechanism for converting the opposite rotations of the armature and stator into a common rotational output direction, and an electrical connection mechanism that supplies functioning electrical communication between the motor/generator and external electrical circuitry while operating the motor/generator.

13 Claims, 10 Drawing Sheets

INCREASED EFFICIENCY DUAL ROTATIONAL ELECTRIC MOTOR/GENERATOR

CROSS-REFERENCE TO RELATED APPLICATIONS

This application claims priority from U.S. provisional application Ser. No. 61/126,320 filed on May 2, 2008 and Ser. No. 61/137,681 filed on Aug. 1, 2008.

BACKGROUND OF THE INVENTION

1. Field of the Invention

The subject invention relates to an electric motor or generator (motor/generator), depending on the mode of operation of the subject device (a motor taking in current during operation and a generator out-putting current during operation), and to suitable systems and uses for the subject motor/generator. The subject motor/generator has an improved efficiency of operation over traditional motors/generators. More specifically, the subject invention is a dual rotational motor that comprises an electric motor/generator in which both the armature and the stator rotate during operation. Generally, the subject motor/generator is suspended or supported by support means, wherein an armature shaft or axle is attached to and extends from an armature of the motor/generator and a stator coupling means is attached to and extends from a stator of the subject motor/generator. Both the armature and the stator rotate, in opposite directions in the subject invention, thereby accessing torsional forces normally lost by utilizing traditional motor/generator mounts that prevent the stator from rotating.

2. Description of Related Art

For a traditional motor, the outside/surrounding motor housing is stationary, as is the "stator" within the housing. The stator is usually affixed to the housing. An internal "rotor" is attached to a shaft or axle that rotates during operation (in one version of a standard motor the rotor may be termed the "armature"). Thus, the armature shaft/axle extends out from the stationary motor housing and rotates when electrical current is applied to the motor (the armature rotates within the stationary stator). The history of electric motors is extensive and one version is found at www.sparkmuseum.com/MOTORS.HTM.

BRIEF SUMMARY OF THE INVENTION

An object of the present invention is to provide an electric motor/generator in which the armature rotates in a first direction and the stator rotates in an opposite second direction about a common central axis and then their opposite rotations are linked to create an output common rotational direction.

A second object of the subject invention is to improve the efficiency of an electric motor/generator by accessing torsional forces normally lost to stationary motor/generator mounts that hold the stator in a fixed position.

Another objective of the subject invention is to improve the efficiency of an electric motor/generator by accessing torsional forces normally lost to stationary motor/generator mounts by allowing the entire motor/generator to rotate freely with an armature and attached armature output means rotating in one direction and a stator and stator output means rotating in an opposite direction about a common central axis.

Yet a further objective of the subject invention is to improve the efficiency of an electric motor/generator by accessing torsional forces normally lost to stationary motor/generator mounts by rotationally securing at opposite ends output means and allowing the entire motor/generator to rotate freely with an armature-connected-shaft rotating in one direction and a stator-connected-out means rotating in an opposite direction and then linking the two opposite rotations into a common rotational output.

Disclosed is a novel configuration of an electric motor or generator, depending on the method of operation (electric current entering the subject device in the motor operational mode or electric current exiting the subject device in the generator operational mode). The subject invention utilizes torsional forces that are normally lost during the operation of existing types of electric motors and generators. Comprising the subject invention motor/generator are two halves that are rotationally mated with one another: 1) the armature half and 2) the stator half, both of which freely rotate during operations (unlike traditional motors in which the stator is stationary). For the subject invention, the two halves rotationally mate with one another. A first shaft is connected to and extends from the armature and a second rotational output means is connected to and extends from the stator. Bearings are incorporated for mounting the device, thereby bracketing both halves between supporting first and second bearings with each half rotating in an opposite direction during operation of the subject motor/generator. When a subject motor contains traditional brushes, the brushes (if present, but a brushless version is also within the realm of this disclosure and it is pointed out that permanent magnets are in the stator and a current running in the armature to produce electromagnets for the brush-type device and that permanent magnets are on the rotor and electromagnets on the stator with a suitable control means for a brushless-type device) are biased to maintain constant electrical contact as both halves rotate (in traditional motors the brushes are connected to a stationary component of the motor and do not rotate (usually, for a continuous electrical connection, the brushes are forced to touch the commutator by associated springs to deliver current in a motor and pick off current in a generator), but when they rotate in the subject invention (in a traditional motor the brushes do not rotate) the created centrifugal force needs to be overcome by a additional biasing means (counter-weights or the like that force the brushes to stay in contact with the commutator and oppose the centrifugal force) to maintain constant electrical contact.

More specifically, the subject enhanced electric motor/generator, comprises an armature that has first and second ends and which rotates about a central axis in a first direction. A stator with first and second ends rotates about the same central axis in a second direction. The stator surrounds at least a portion of the armature (in a traditional motor/generator like manner). An axle extends along the common central axis and is secured to the armature, wherein the axle rotates in the first direction (it is pointed out that in a reverse, yet basically equivalent, embodiment the axle may be secured to the stator, if desired). Usually, axle support means for supporting the axle and allowing rotation of the axle in the first direction are included in the subject invention. Rotational output means for converting the armature first direction rotation and the stator second direction rotation into a common rotational output direction are included in the subject invention. Electrical connection means are provided for supplying functioning electrical communication between the motor/generator and external electrical circuitry while operating the motor/generator. Preferably, the electrical connection means includes centrifugal-force-overcoming electrical contact maintenance means. Commonly, the centrifugal-force-overcoming electrical contact maintenance means comprises at least one brush (assuming the subject motor/generator utilizes brushes and is not a brushless system, but it is noted that even a brushless system is contemplated as being with the realm of this disclosure), a commutator (needed for electrical connection and necessary electromagnet field reversals) upon which the brush rides for electrical contact during operation of the electric motor/generator, and brush-associated counter-weights for overcoming centrifugal force on each brush, whereby each brush is directed inward toward the common central axis for maintaining brush-to-commutator contact during operation of the electric motor/generator.

Frequently, both the armature and stator are enclosed by a stator housing affixed to the stator. The stator housing rotates in the second direction about the common central axis and about the interior armature too. Clearly, in a brushless motor/generator an equivalent reversed configuration would apply.

Optionally, the rotational output means may comprise several equivalent variations, depending on the manner of use and type of device employing the motor/generator. A first embodiment comprises a drive shaft proximate said motor/generator, a pair of drive belts with one belt of the drive belt pair connecting the armature to the drive shaft and the another belt of the drive belt pair connecting the stator to the drive shaft, wherein one belt in the pair contains a 180° twist, thereby causing the drive shaft to rotate in the common rotational output direction.

A second embodiment comprises a rotational output means having a set of planetary gears associated with the stator second end (or armature first end, if desired), wherein when the stator rotates in the second direction the second direction rotation is converted into the first direction rotation (the armature's rotational direction) at the axle by the planetary gears.

A third embodiment of the rotational output means comprises a set of bevel gears that generate the common rotational output direction.

A forth embodiment of the rotational output means comprises a combination of armature-associate and stator-associated gears, sprockets, idler shaft, and chain drive that generates the common rotational output direction from the oppositely rotating armature and stator.

Optionally, the electrical connection means includes axle-associated slip-ring electrical pickup means.

Further objects and aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

Figure 1:
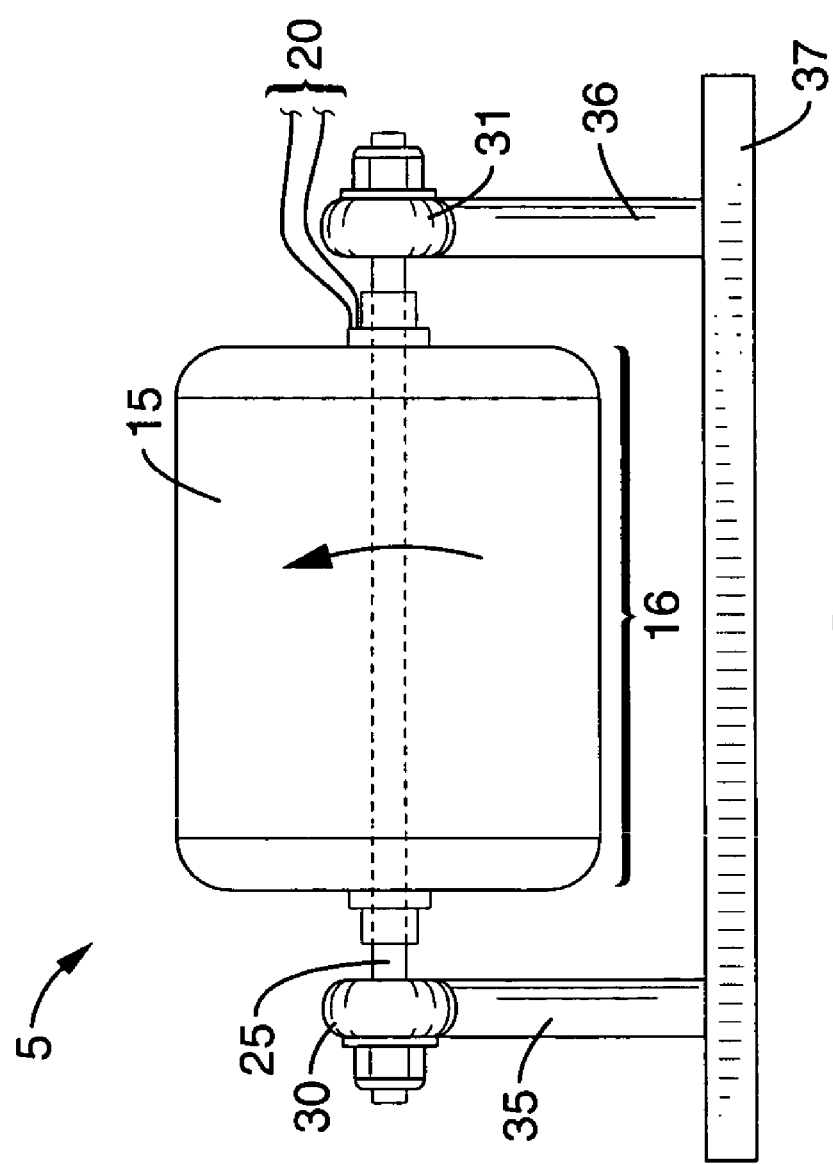
FIG. 1 is a perspective view of a first embodiment of the subject invention, operating as an electric motor, and mounted to bearing-containing support members.
Figure 2A:
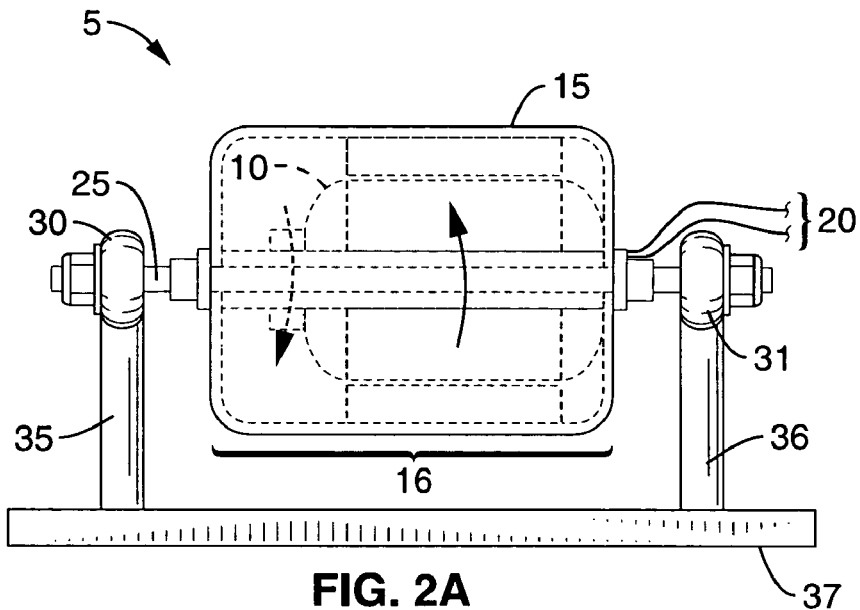
FIG. 2A is a perspective view, including interior components in dashed lines, of the first embodiment of the subject invention seen in FIG. 1 showing the dual rotational directions for the interior armature and the surrounding stator.
Figure 2B:
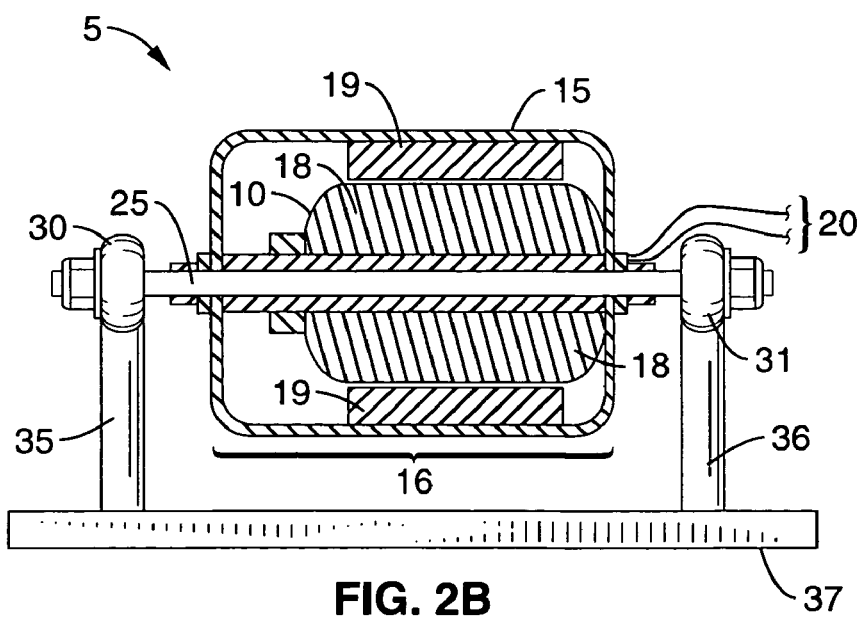
FIG. 2B is a cross-sectional view of the first embodiment seen in FIGS. 1 and 2A showing the interior armature and surrounding stator.
Figure 5:
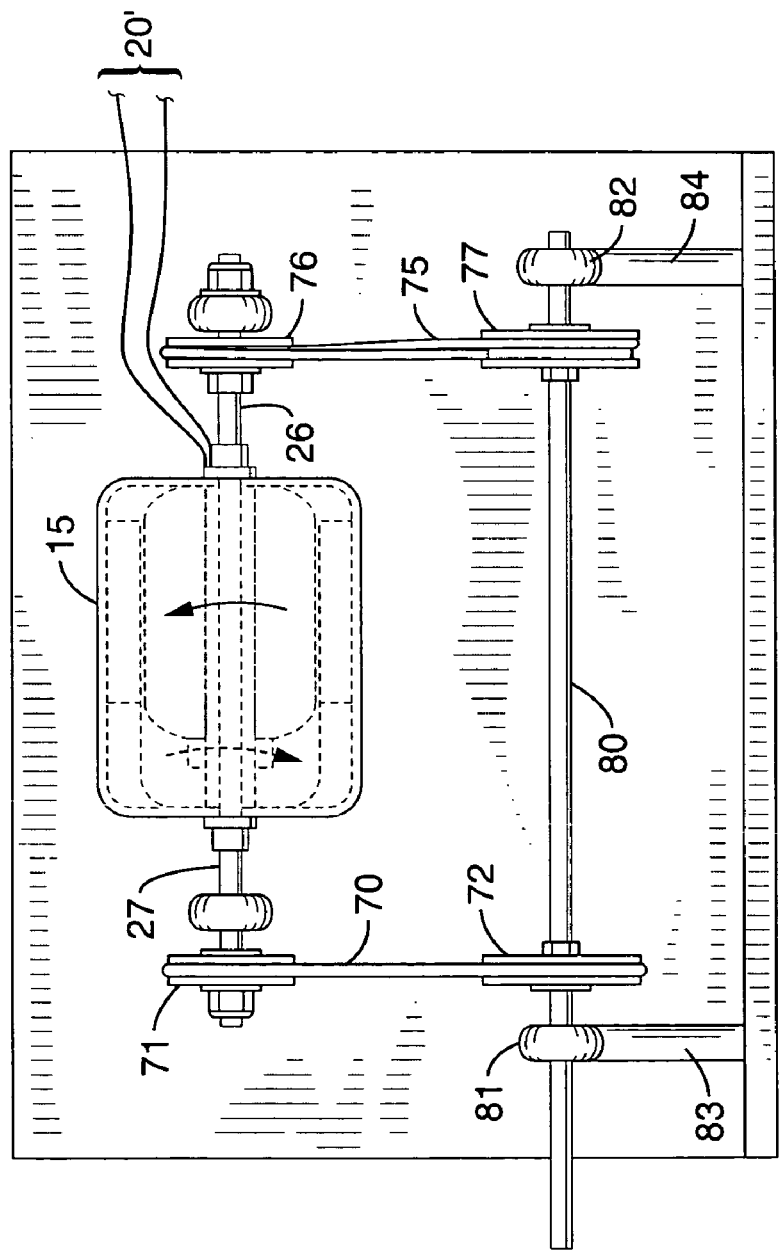

FIG. 5 is a perspective view, including interior components in dashed lines, of the motor first embodiment of the subject invention seen in FIGS. 1, 2A, and 2B, showing the dual rotational directions for the interior armature and the surrounding stator in which the rotational output of the armature and the rotational output of the stator are aliened into a common rotational direction by utilizing a second drive belt that contains a 180° twist, relative to a first drive belt, with both belts then driving a drive shaft in a common rotational direction.

Figure 6:
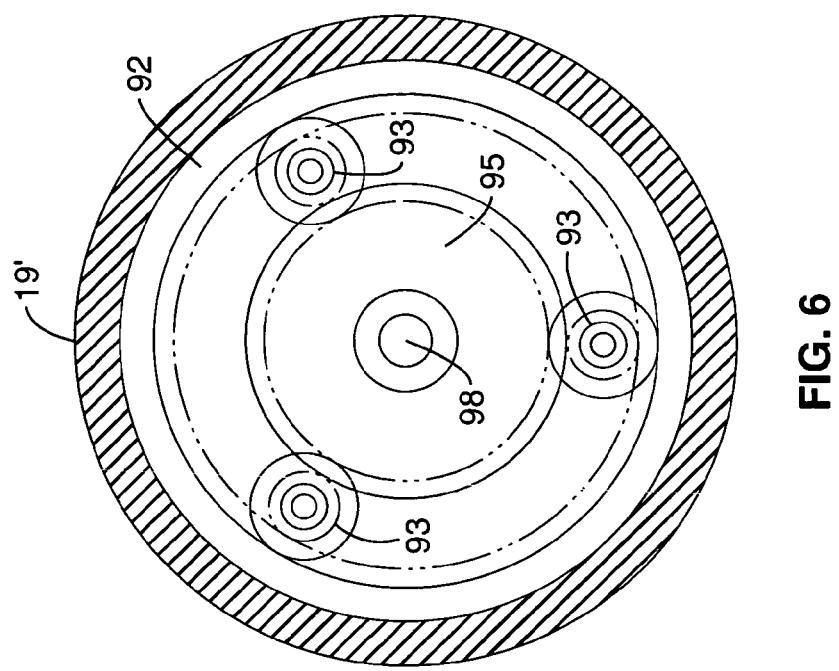

FIG. 6 is an end view of planetary gears that convert the opposite rotation of the armature or stator into a common rotational direction with the stator or armature, respectively.

Figure 3:
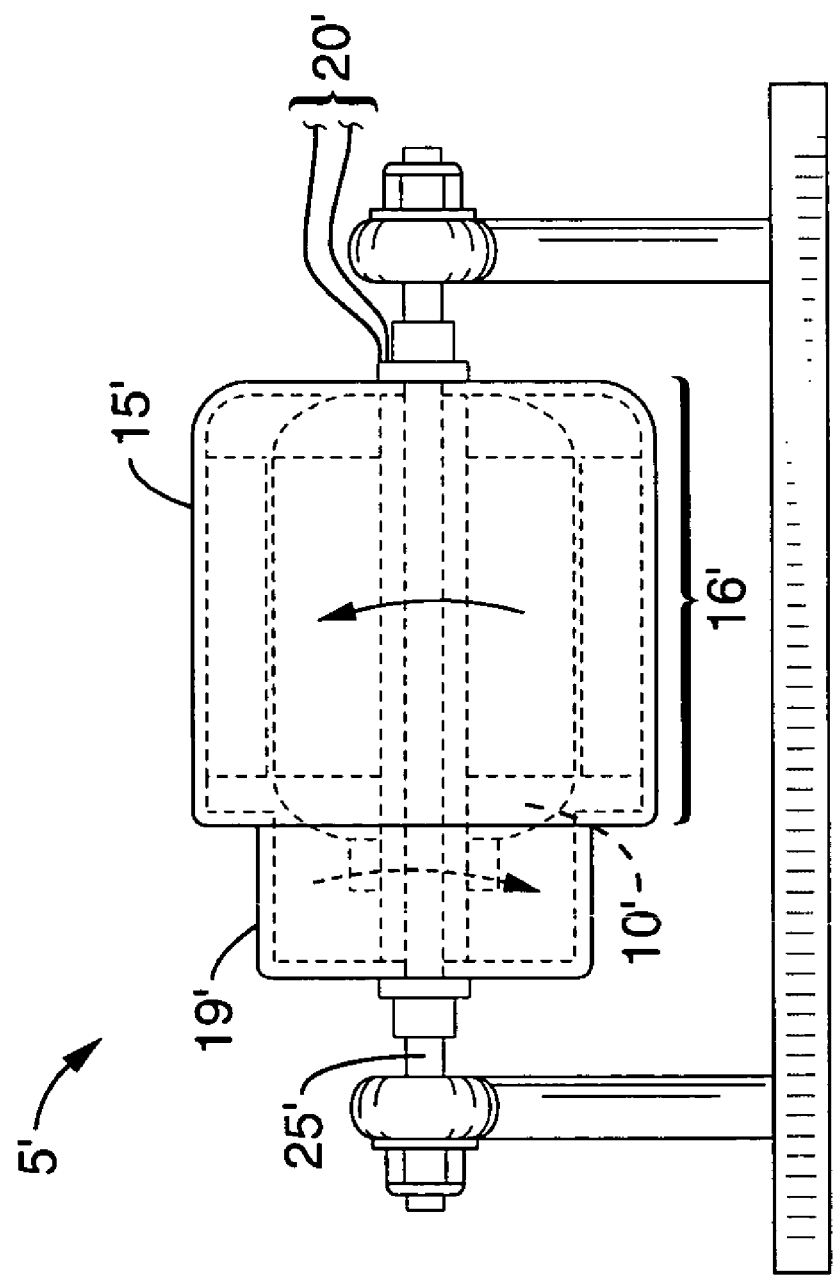
FIG. 3 is a perspective view, including interior components in dashed lines, of a second embodiment of the subject invention, operating as an electric motor, showing the dual rotational directions for the interior armature and the surrounding stator.
Figure 7:
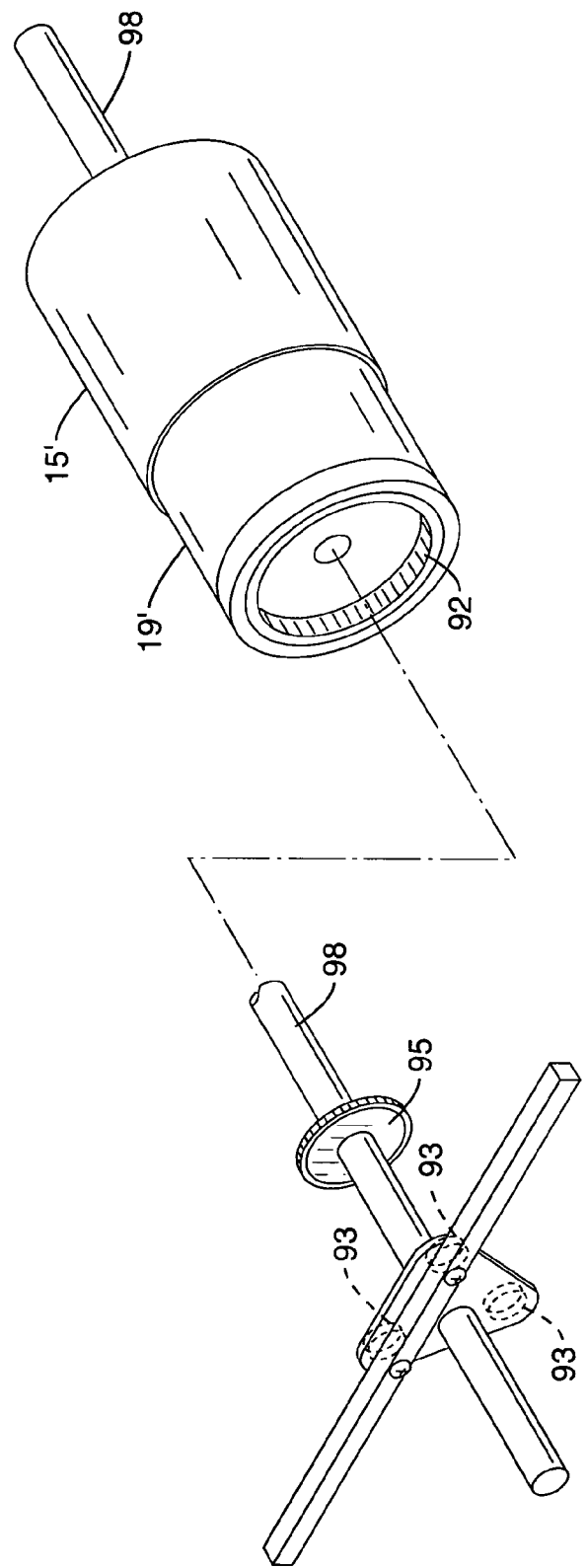

FIG. 7 is an exploded-perspective view of the second motor embodiment of the subject invention seen in FIG. 3 showing the central axis shaft and armature having associated planetary gears that align the opposite rotations of the armature and stator into a common rotational direction to drive the shaft.

Figure 8:
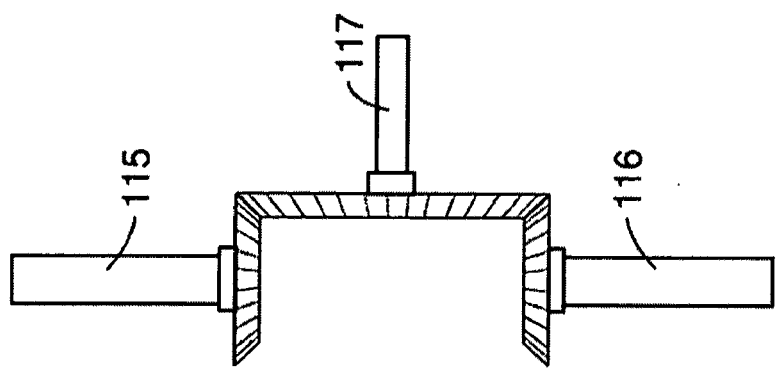

FIG. 8 is side-view of bevel gears that permit the oppositely rotating armature and stator in the subject invention to produce a common rotational direction to the associated drive shaft.

Figure 9:
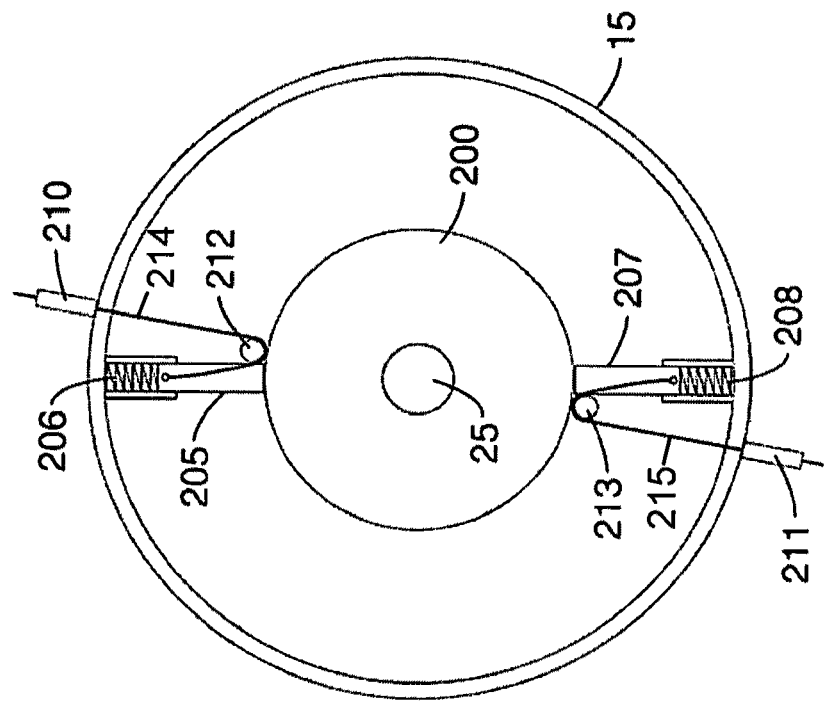

FIG. 9 is cross-sectional view of the subject invention showing counter-weighted brushes that stay in contact with the commutator during rotational operation of the subject device.

Figure 10:
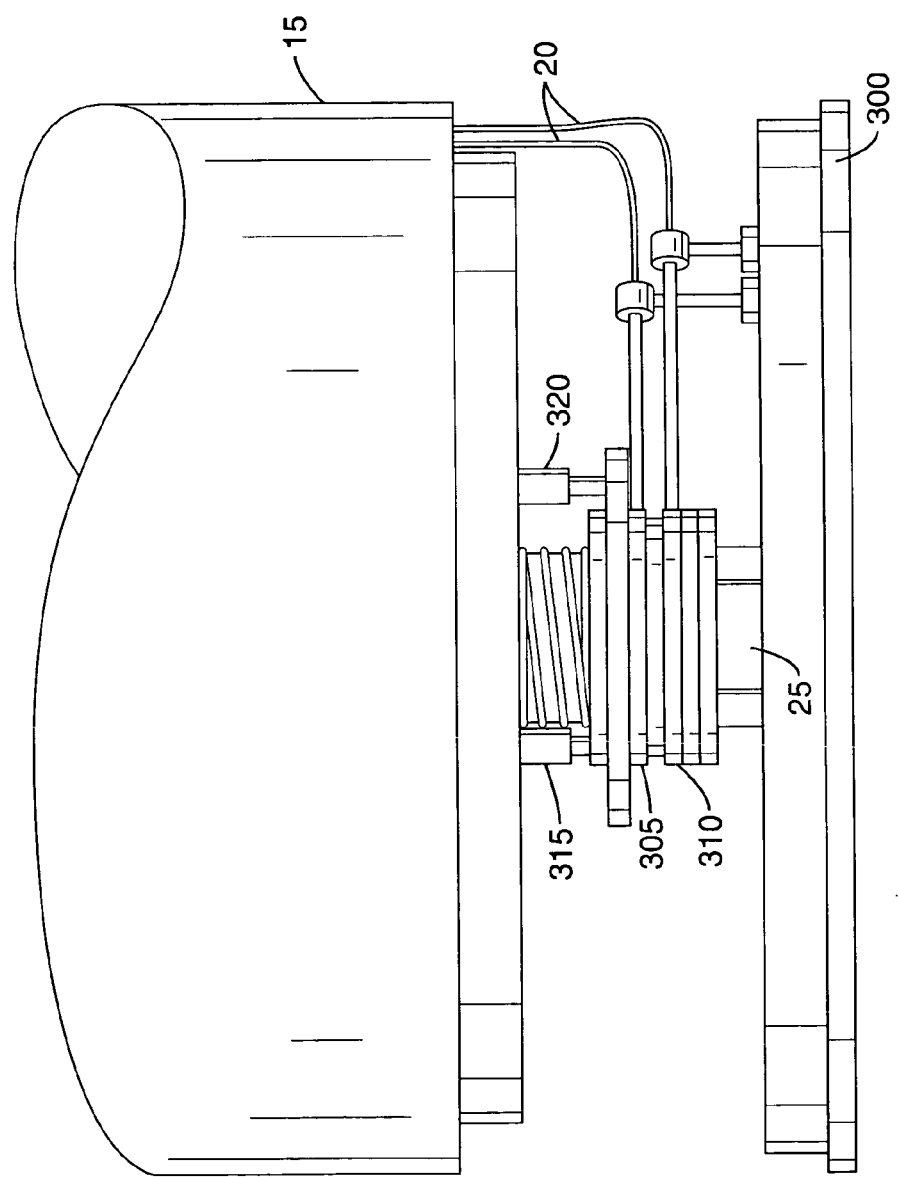

FIG. 10 shows a side-view of the subject invention in which the device is partially opened to show clearly the slip-ring electrical connections within the device.

DETAILED DESCRIPTION OF THE INVENTION

Referring more specifically to the drawings, for illustrative purposes the present invention is presented in the embodiments generally shown in FIG. 1 through FIG. 10. It will be appreciated that the subject apparatus may vary as to configuration and as to details of the parts without departing from the basic concepts as disclosed herein.

It is stressed that the subject invention may be operated as either an electric motor or as a generator. Clearly, this ability is due to the well known relationship that an electric motor is, essentially, a generator run in reverse and vice versa. Several embodiments are presented and other equivalent variations are considered to be within the realm of this disclosure. Both DC or AC motors are both within the realm of this disclosure, however, for exemplary purposes only, the DC embodiment will be utilized to relate the subject invention.

Generally, the subject invention is an enhanced electric motor/generator that includes an armature having first and second ends that rotates about a central axis in a first direction, a stator having first and second ends that rotates about the central axis in a second direction and surrounds at least a portion of the armature, an axle extending along the central axis and secured to the armature, wherein the axle rotates in the first direction, axle support means for supporting the axle and allowing rotation of the axle in the first direction, rotational output means for converting the armature first direction rotation and the stator second direction rotation into a common rotational output direction, and electrical connection means for providing functioning electrical communication between the motor/generator and external electrical circuitry while operating the motor/generator. Frequently, the electrical connection means includes axle-associated slip-ring electrical pickup means.

Often the electrical connection means includes centrifugal-force-overcoming electrical contact maintenance means. Preferably, the centrifugal-force-overcoming electrical contact maintenance means comprises at least one brush, a commutator upon which the brush rides for electrical contact during operation of the electric motor/generator, and brush-associated counter-weights for overcoming centrifugal force on each brush, whereby each brush is directed inward toward the central axis for maintaining brush-to-commutator contact during operation of the electric motor/generator.

Optionally, the armature and the stator are both enclosed by a stator housing affixed to the stator and rotating with the stator in the second direction about the central axis.

Optionally, the rotational output means will vary upon the exact situation in which the subject device is employed. One embodiment of the rotational output means comprises a drive shaft proximate the motor/generator, a pair of drive belts with one belt of the drive belt pair connecting the armature to the drive shaft and another belt of the drive belt pair connecting the stator to the drive shaft, wherein one belt in the pair contains a 180° twist, thereby causing the drive shaft to rotate in the common rotational output direction.

A second embodiment of the rotational output means comprises a set of planetary gears associated with the stator, wherein when said stator rotates in the second direction the second direction rotation is converted into the first direction rotation at said axle.

A third embodiment of the rotational output means comprises a set of bevel gears that generate the common rotational output direction.

A fourth rotational output means comprises a combination of armature-associate and stator-associated gears, sprockets, idler shaft, and chain drive that generates the common rotational output direction from the oppositely rotating armature and stator.

Specifically, a first embodiment of the subject invention, utilized as an electric motor, is depicted in FIGS. 1, 2A, and 2B. Specifically, the subject invention motor 5 comprises two halves that are rotationally mated with one another: 1) the armature 10 and 2) the stator 15 (the term "stator" is utilized for descriptive purposes only and does not imply that this half is stationary, as is the case for a traditional stator), both the armature 10 and the stator 15 freely rotate during operations (again, unlike traditional motors in which the stator is stationary). Normally, the armature 5 contains the electromagnets 18 (coils of wire in which current flows) that are connected to an outside power source by suitable wires 20. Usually, the stator 15 contains the permanent magnets 19. The directional arrows seen in FIGS. 1 and 2A illustrate the opposite rotational directions of the moving armature 10 and stator 15. The first motor embodiment 5 depicts the stator being affixed to and surrounded by a stator housing 16. The stator housing 16 also encloses the internal armature 10.

A central axle or shaft 25 runs down the central axis of both the armature 10 and the stator 15. The axle or shaft 25 is supported with bearings 30 and 31 that attach it to support members 35 and 36. A base plate 37 anchors the support members 35 and 36.

When operating current is applied to the electromagnets 18 in the armature 10 rotational forces are created between the electromagnets 18 and the permanent magnets 19 in the stator 15. As in traditional electric motors, magnetic field reversing interactions between the contacting brushes associated with the stator and the rotor-associated commutator perpetuate the rotational forces. As with a traditional electric motor, the armature 10 rotates about the axle or shaft 25, but with the subject invention, so does the stator 15, but in an opposite rotational direction. As noted above, for exemplary purposes only, a brush-containing motor will be described herein. Brushless motors are within the realm of this disclosure, however, it is sufficient, for exemplary purposes, to describe the traditional brush-containing embodiments to illustrate and appropriately convey the novel construction and functioning of the subject invention. Actually, brushless motors do not require means to overcome centrifugal forces that create difficulties produced by rotating brushes in the stator (rotating brushes are eventually forced away from the commutator, thereby breaking necessary electrical contact).

FIG. 3 illustrates a second embodiment of the electric motor version of the subject invention. In this embodiment "primes" are utilized to denote equivalent components to those found in the first embodiment. In this embodiment the armature 10' is surrounded by its own armature housing 19' and the stator housing 16' (containing the stator 15') is less extensive. When this embodiment is operating, the armature housing 19' can be seen rotating in an opposite direction to that of the stator housing 16'. The first and second embodiments function in identical fashion with one another.

Figure 4A:
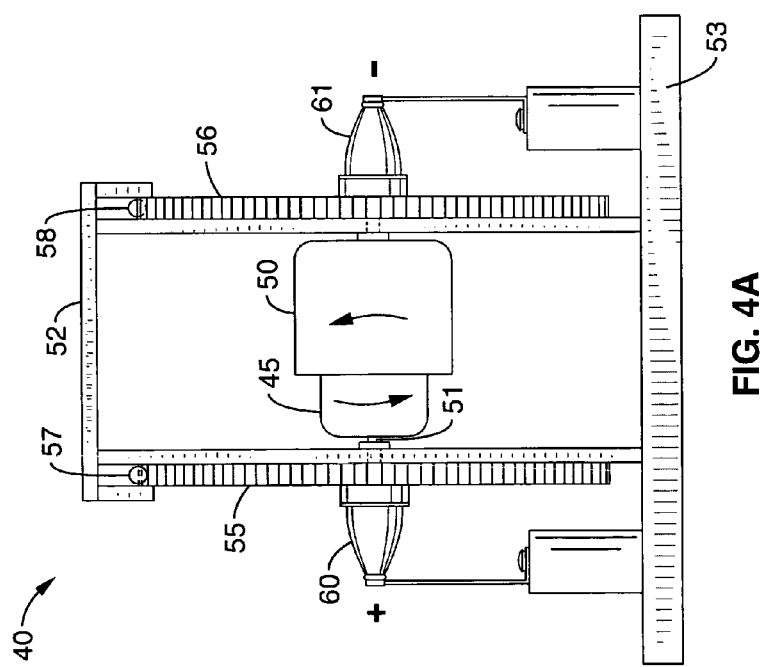
FIG. 4A is a perspective view of a first embodiment of the subject invention, operating as a generator, that is mounted to two air-rotated drive wheels that rotate in opposite directions.
Figure 4B:
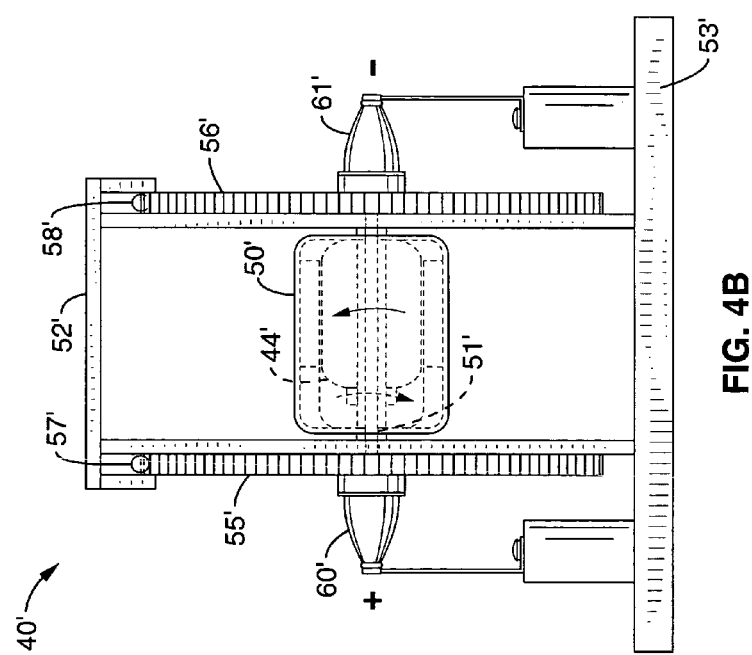
FIG. 4B is a perspective view of a second embodiment of the subject invention, operating as a generator, that is mounted to two air-rotated drive wheels that rotate in opposite directions.

FIG. 4A depicts a first embodiment of the generator 10 configuration for the subject invention and FIG. 4B show a second embodiment of the generator 10' configuration for the subject invention. The device shown in FIGS. 4A and 4B differ in same manner in which the motor equivalent device in FIG. 3 differs from the motor device shown in FIGS. 1, 2A, and 2B. The FIG. 4A generator 40 first embodiment has both an armature housing 45 and a stator housing 50, while the FIG. 4B generator 40' has only a stator housing 50' that shows externally.

It is stressed that for the generator operational configuration of the subject invention, the examples shown in FIGS. 4A and 4B are just that, exemplary, and it is clear that powering sources other than compresses air may be used to power the subject generator (e.g. liquids, wind, and equivalent means).

For the FIG. 4A first embodiment, the generator 40, the armature housing 45 and stator housing 50 both rotate about, in different directions, a central axle or shaft 51 that held with a support structure 52 that is attached to a base member 53. Each air-driven drive wheel 55 and 56 has air-catching teeth on the outer perimeter edge. Drive wheel 55 is rigidly affixed to the armature half of the subject device and drive wheel 56 is rigidly affixed to the stator half of the subject device. Oppositely directed compresses air jets 57 and 58 force wheels 55 and 56 in opposite directions, thus rotating the armature in the opposite direction as the stator to produce current that exits the subject device via connectors 60 and 61.

For the FIG. 4B second embodiment, the generator 40', there is no armature housing and the stator housing 50' encloses the armature 44'. The armature 44' and stator (attached interior to the stator housing 50') rotate about on another, in opposite directions, a central axle or shaft 51' held within a support structure 52' that is attached to a base member 53'. Each air-driven drive wheel 55' and 56' has air-catching teeth on the outer perimeter edge. Drive wheel 55' is rigidly affixed to the armature half of the subject device and drive wheel 56' is rigidly affixed to the stator half of the subject device. Oppositely directed compresses air jets 57' and 58' force wheels 55' and 56' in opposite directions, thus rotating the armature 44' in the opposite direction as the stator and stator housing 50' to produce current that exits the subject device via connectors 60' and 61'.

Since the armature and stator of the subject invention rotate in opposite directions, an important issue concerns how oppositely rotating halves may be effectively coupled to produce a common rotational output direction. Several possible solutions are presented herein, but other equivalent variations are considered to be within the realm of this disclosure. First, as related in FIG. 5, one manner in which to create a common rotational output is to utilize a pair of drive belts in which one incorporates a 180° twist relative to the other. The stator housing 16 is rotating in one direction and attached to an axle 26 that rotates with its motion and the armature is connected to another axle 27 that rotates in the opposite direction. Pulleys 71 and 72 support drive belt 70 in which pulley 72 is secured to drive shaft 80 via bearings 81 and support member 83. Pulleys 76 and 77 support drive belt 75 in which pulley 77 is secured to drive shaft 80 via bearings 82 and support member 84. Drive belt 75 contains an 180° twist that rotates pulley 77 in the same direction as pulley 72 to produce a common rotational output for drive shaft 80.

Second, as depicted in FIGS. 6 and 7, planetary gears are utilized to reverse the rotational direction of one half of the subject invention to match the rotational direction of the other half. Suitably configured planetary gears could be fashioned to reverse the rotational direction of either the armature or the stator, but for exemplary purposes FIGS. 6 and 7 illustrate the process via planetary gears reversing the rotational direction of the armature. FIGS. 6 and 7 show the planetary gears associated with the second motor embodiment seen previously in FIG. 3. A large outer ring gear 92 is fastened within the armature housing 19'. Three smaller gears 93 are placed between the large outer ring gear and the central gear 95 that is secured to the axle 98. As the outer large ring gear 92 rotates in one direction the inner central gear 95 rotates in the opposite direction, thus matching the rotational direction of the stator-associated axle 98.

Third, as seen in FIG. 8, bevel gears convert the opposite rotational directions into a common rotational output direction. Bevel gear 115 is attached to the armature, bevel gear 116 is attached to the stator, and a common rotation output is generated at bevel gears 117 and 118.

Fourth, other rotational output means are possible and considered within the realm of this disclosure, including a combination of armature-associate and stator-associated gears, sprockets, idler shaft, and chain drive that generates the common rotational output direction from the oppositely rotating armature and stator.

With the subject invention, when the stator rotates (again, not the traditional stationary stator), if the motor is a brush-containing configuration, the brushes will be forced outward and away from the commutator, thus breaking the necessary electrical connection required to operate the motor. To counter the centrifugal force exerted on the brushes during operation of the subject device, means are provided to force the brushes into the commutator. A preferred method is illustrated in FIG. 8 in which the rotating stator half 15 rotates about the central axle or shaft 25. A commutator 200 has brushes 205 and 207 forced against it by springs 206 and 208. However, when the subject stator rotates the brushes 205 and 207 begin to break contact with the commutator 200 unless an opposing force is present. Although equivalent systems are considered within the realm of this disclosure, preferably, an opposing force is created in the subject motor by a counter-weight system that utilized an appropriately sized counter-weight to cable means that pivots about anchor points 212 and 213 before attaching to brushes 205 and 207. The counter-weights 210 and 211, attached to associated cables 214 and 215, respectively, are forced outward as the stator rotated, thereby forcing the brushes inward and maintaining contact with the commutator.

Since both the armature and stator are rotating in the subject device, means are provided to maintain electrical connect between the armature electromagnets and the outside power source. One preferred means is shown in FIG. 10 in which the stator housing 15 (or 16, depending on the embodiment) has its end plate 300 slightly moved outward to show the relevant interior connections (during operation, the end plate 300 is mated flush with the stator housing 15). The connection wires 20 attach to slip-rings 305 and 310 that are suitably isolated by insulated pins 315 and 320 and complete the needed connections to the electromagnets as the two halves rotate about the central shaft 25.

It is noted that a subject invention has been tested for improved efficiency in various ways; in particular, a modified scooter was tested against a standard scooter (containing the subject dual rotational motor) with an equivalent non-modified motor and identical overall mass. The modified scooter was shown to have significantly more overall power and maximum speed than the standard version. While running at constant velocities (in a side-by-side road test, at approximately 20 mph) the modified scooter easily out accelerated the standard scooter and traveled a much greater overall distance with the same battery charge. For the modified scooter, the subject dual rotational motor is associated with the scooter by drive chains that couple the oppositely rotating armature and stator halves together to power a common single direction drive shaft.

Exemplary Systems and Uses for the Subject Motor/Generator:

These systems and uses are by way of example only and are not intended to be limiting as to equivalent new systems and new uses that one skilled in the art would appreciate, based on the disclosed subject invention.

1) Small Appliances and Power Tools: The subject invention, with suitable linkages, permits the conversion of contra rotating end shafts (armature and stator shafts) into a single rotational direction output motor. When the subject invention is utilized in small appliances, power tools, and the like, where the units are designed around the subject motor system, both an increase in energy savings and an increase in available power output results.

2) Wheel Chairs and Scooters: The subject invention, with suitable linkages, permits the conversion of contra rotating end shafts (armature and stator shafts) into a single rotational direction output motor. When the subject invention is utilized in small vehicles such as wheel chairs and scooters, where the units are designed around the subject motor system, both an increase in energy savings and an increase in available power output results. Additionally, based on the increased power output for the subject invention, the subject smaller motors will allow for completely redesigned configurations for the vehicles.

3) New and Retro-fitted Vehicles: The subject invention, with suitable linkages, permits the conversion of contra rotating end shafts (armature and stator shafts) into a single rotational direction output motor. When the subject invention is utilized in vehicles such as automobiles, trucks, and motorcycles, where the units are designed around the subject motor system, both an increase in energy savings and an increase in available power output results.

4) Larger Vehicles including Medium-box Trucks, Large Simi-Trucks and Motor Homes: The subject invention, with suitable linkages, permits the conversion of contra rotating end shafts (armature and stator shafts) into a single rotational direction output motor. When the subject invention is utilized with medium-box trucks, large semi-trucks or motor homes, where the units are designed around the subject motor system, both an increase in energy savings and an increase in available power output results. It is noted that due to the full time-continuous need for energy/power of long-haul trucks and motor homes, they will need large storage-volume of battery-power (i.e., numerous large battery banks or the equivalent for power storage capacity).

5) Air Conditioners, Heat Pumps, and General Industrial Motors: The subject invention, with suitable linkages, permits the conversion of contra rotating end shafts (armature and stator shafts) into a single rotational direction output motor. When the subject invention is utilized in air conditioners, heat pumps, and general industrial motors, where the units are designed around the subject motor system, both an increase in energy savings and an increase in available power output results.

6) Power Plant Generators: The subject invention, with suitable linkages, permits the conversion of traditional generators into contra "steam or hydro" driven "two ends" generators (i.e., standard turbine driven shaft end on the armature/shaft and a similar contra rotating shaft end added to the stator/shaft). For the subject generator, the armature and the stator are powered or turned in opposite directions and the combination uses less energy (relative to the total input energy needed for traditional generators) and develops more electrical power output (relative to traditional generators). It is noted that the subject invention generator uses approximately the same energy input that was needed to turn just one traditional turbine shaft in one direction. When power plants are engineered around the subject motor/generator system, this will then cause an increase of power output in the adapted electricity generating plants.

7) Wind Power Generators: The subject invention, with suitable linkages, permits the conversion of traditional wind generators into push/push wind generators with contra rotating propellers, thereby increasing the available generated power over the traditional wind systems now in use.

8) Powered Boats: The subject invention, with suitable linkages, permits the conversion of contra rotating end shafts (armature and stator shafts) into a single rotational direction output motor. When the subject invention is utilized in powered boats (both with and without wind power), where the units are designed around the subject motor system, both an increase in energy savings and an increase in available power output results.

9) Helicopters and Airplanes: The subject invention, with suitable linkages, permits the conversion of contra rotating end shafts (armature and stator shafts) into a single rotational direction output motor. When the subject invention is utilized in helicopters and airplanes, where the units are designed around the subject motor system, both an increase in energy savings and an increase in available power output results. The subject invention will allow the use of push/pull contra rotating rotors or propellers, thereby increasing the available lift or thrust power.

10) Batteries and Electrical Charging Systems: Due to increased motor efficiency, the subject invention permits batteries powering an electric motor to function for longer periods and various types of electrical charging systems to provide less overall power (again, due to increased motor efficiency).

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiments that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element or component in the present disclosure is intended to be dedicated to the public regardless of whether the element or component is explicitly recited in the claims. No claim element herein is to be construed under the provisions of 35 U.S.C. 112, sixth paragraph, unless the element is expressly recited using the phrase "means for."

What is claimed is:

1. An energy conserving electric motor/generator, comprising:
   a. a first rotating member having first and second ends that rotates about a central axis in a first direction;
   b. a second rotating member having first and second ends that rotates about said central axis in a second direction and surrounds at least a portion of said first rotating member;
   c. an axle extending along said central axis and secured to said first rotating member, wherein said axle rotates in said first direction;
   d. axle support means for supporting said axle and allowing rotation of said axle in said first direction;
   e. rotational output means for converting said first rotation member's first direction rotation and said rotation member's second direction rotation into a common rotational output direction; and
   f. electrical connection means for providing functioning electrical communication between said motor/generator and external electrical circuitry while operating said motor/generator, wherein said electrical connection means comprises;
      i. a brush;
      ii. a commutator; and
      iii. a centrifugal-force-overcoming electrical contact maintenance means having a counter-weight that is coupled by a flexible cable to said brush, wherein said counter-weight forces said brush into said commutator during rotation of said second rotating member, thereby countering centrifugal force on said brush and maintaining contact between said brush and said commutator.

2. An energy conserving electric motor/generator according to claim 1, wherein said centrifugal-force-overcoming electrical contact maintenance means includes said counter-weight mounted in a position that is exterior to said second rotating member.

3. An energy conserving electrical motor/generator according to claim 2, wherein said centrifugal-force-overcoming electrical contact maintenance means comprises:
   a. said brush;

b. said commutator upon which said brush rides for electrical contact during operation of the electric motor/generator;

c. an anchor point; and d. a brush-associated counter-weights connected to said brush for overcoming centrifugal force on said brush, whereby said brush is directed inward toward said central axis for maintaining brush-to-commutator contact during operation of the electric motor/generator, wherein said counter-weight is connected to said brush by said cable, wherein said cable extends over said anchor point, and attaches to said counter weight exterior to said second rotating member.

4. An energy conserving electric motor/generator, comprising:

a. an armature having first and second ends that rotates about a central axis in a first direction;

b. a stator having first and second ends that rotates about said central axis in a second direction and surrounds at least a portion of said armature;

c. an axle extending along said central axis and secured to said armature, wherein said axle rotates in said first direction;

d. axle support means for supporting said axle and allowing rotation of said axle in said first direction;

e. rotational output means for converting said armature first direction rotation and said stator second direction rotation into a common rotational output direction; and f. electrical connection means for providing functioning electrical communication between the motor/generator and external electrical circuitry while operating the motor/generator, wherein said electrical connection means comprises;

i. a brush;

ii. a commutator; and iii. a centrifugal-force-overcoming electrical contact maintenance means having a counter-weight that is coupled by a flexible cable to said brush, wherein said counter-weight forces said brush into said commutator during rotation of said stator, thereby countering centrifugal force on said brush and maintaining contact between said brush and said commutator.

5. An energy conserving electric motor/generator according to claim 4, wherein said centrifugal-force-overcoming electrical contact maintenance means includes said counter-weight mounted in a position that is exterior to said stator.

6. An energy conserving electrical motor/generator according to claim 5, wherein said centrifugal-force-overcoming electrical contact maintenance means comprises:

a. said brush;

b. said commutator upon which said brush rides for electrical contact during operation of the electric motor/generator;

c. an anchor point; and d. a brush-associated counter-weights connected to said brush for overcoming centrifugal force on said brush, whereby said brush is directed inward toward said central axis for maintaining brush-to-commutator contact during operation of the electric motor/generator, wherein said counter-weight is connected to said brush by said flexible cable, wherein said flexible cable extends over said anchor point, and attaches to said counter weight exterior to said stator.

7. An energy conserving electrical motor/generator according to claim 4, wherein said armature and said stator are both enclosed by a stator housing affixed to said stator and rotating in said second direction about said central axis, wherein said stator housing contains said counter-weight mounted exterior to said stator.

8. An energy conserving electrical motor/generator according to claim 4, wherein said electrical connection means includes said axle-associated slip-ring electrical pickup means.

9. An energy conserving electric motor, comprising:

a. an armature having first and second ends that rotates about a central axis in a first direction;

b. a stator having first and second ends that rotates about said central axis in a second direction and surrounds at least a portion of said armature;

c. an axle extending along said central axis and secured to said armature, wherein said axle rotates in said first direction;

d. axle support means for supporting said axle and allowing rotation of said axle in said first direction;

e. rotational output means for converting said armature first direction rotation and said stator second direction rotation into a common rotational output direction; and f. electrical connection means for providing functioning electrical communication between the motor and external electrical circuitry while operating the motor, wherein said electrical connection means comprises;

i. a brush;

ii. a commutator; and iii. a centrifugal-force-overcoming electrical contact maintenance means having a counter-weight mounted that is coupled by a flexible cable to said brush, wherein said counter-weight forces said brush into said commutator during rotation of said stator, thereby countering centrifugal force on said brush and maintaining contact between said brush and said commutator.

10. An energy conserving electric motor according to claim 9, wherein said centrifugal-force-overcoming electrical contact maintenance means includes said counter-weight mounted in a position that is exterior to said stator.

11. An energy conserving electrical motor according to claim 10, wherein said centrifugal-force-overcoming electrical contact maintenance means comprises:

a. said brush;

b. a said commutator upon which said brush rides for electrical contact during operation of the electric motor;

c. an anchor point;

d. a brush-associated counter-weights connected to said brush for overcoming centrifugal force on said brush, whereby said brush is directed inward toward said central axis for maintaining brush-to-commutator contact during operation of the electric motor, wherein said counter-weight is connected to said brush by said flexible cable, wherein said flexible cable extends over said anchor point, and attaches to said counter weight exterior to said stator.

12. An energy conserving electrical motor according to claim 9, wherein said armature and said stator are both enclosed by a stator housing affixed to said stator and rotating in said second direction about said central axis, wherein said stator housing contains said counter-weight mounted exterior to said stator.

13. An electrical motor according to claim 9, wherein said electrical connection means includes said axle-associated slip-ring electrical pickup means.

* * * * *